Sept. 3, 1935.                C. SCHMITTUTZ                 2,012,976
                     COMPOSITION FOR IMPREGNATING WOOD
                        Original Filed Sept. 28, 1934
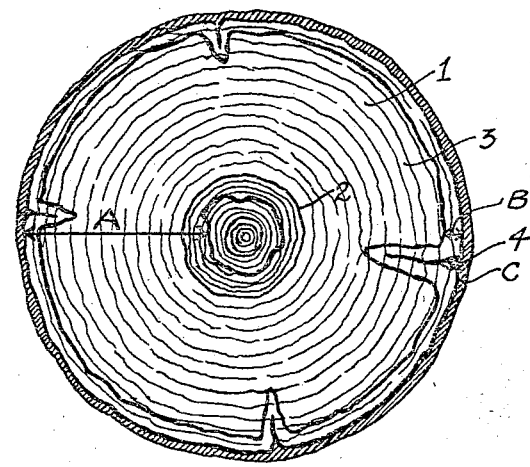
INVENTOR.
CARL SCHMITTUTZ
BY
Worth Wade
ATTORNEYS.

UNITED STATES PATENT OFFICE

2,012,976

COMPOSITION FOR IMPREGNATING WOOD

Carl Schmittutz, Bad Kissingen, Germany, assignor to Osmose Holzimpraegnierungs G. m. b. H., Leipzig, Germany, a corporation of Germany Original application September 28, 1934, Serial No. 745,966. Divided and this application January 14, 1935, Serial No. 1,590

8 Claims. (Cl. 134—78.6)

This invention relates in general to the preservation of wood and in particular to an improved composition for impregnating green wood which is in a freshly cut and moist condition to increase its resistance to decay and to attacks by insects and fungi. This application is a division of my application Serial No. 745,966, filed September 28, 1934.

To facilitate the diffusion of the impregnating substance into the wood, it has hitherto been considered necessary to cut the trees while the sap content is at the minimum, that is, during the winter. The cut trees are dried for a long period of time during which the wood frequently becomes impregnated with spores of fungi, molds and other organisms. The impregnation is then carried out with the air of vacuum, pressure and elevated temperature necessitating the use of complicated and expensive apparatus including vacuum chambers or immersion tanks and means for heating the same. However, even with the expenditure of much time and expensive equipment, it has not been possible heretofore to extend the impregnation throughout the entire core of the trunk.

It is a general object of the invention to provide a composition for the preservation of wood by a simple and economical process which makes use of the natural phenomenon of osmosis to bring about the substantially complete impregnation of the wood without the use of vacuum, pressure or elevated temperature.

It is another object of the invention to provide a composition for impregnating the wood comprising a preservative, an ingredient fixing the preservative so as to prevent its escape when the wood is subjected to leaching by rain or damp soil, and an agent which brings the ingredients into intimate contact with the surface of the wood.

It is a specific object of the invention to provide a novel composition for the preservation of wood characterized by comprising a preservative adapted to penetrate the wood by osmosis and a protective agent adapted to penetrate the wood by capillary diffusion and to prevent the escape of the preservative from the wood, and a paste-forming substance adapted to bring the preservative and protective agents into intimate contact with the surface of the wood.

Other objects of the invention will in part be obvious and will in part appear hereinafter.

Generally speaking, the composition of the invention consists of a tacky paste comprising a water soluble preservative agent adapted to penetrate the wood by osmosis, a water insoluble protective agent adapted to penetrate the wood by capillary diffusion, water and a substance adapted to form a tacky paste with water.

The invention accordingly comprises a composition having the properties, the ingredients and the proportion of ingredients all as set forth hereinafter and the scope of the application of which will be given in the claims.

For a more complete understanding of the nature and objects of the invention, reference should be had to the following detailed description taken in connection with the accompanying drawing, in which the figure illustrates a view in section of a tree trunk after it has been treated with the composition of the invention.

For the preservative agent there is employed a water soluble inorganic substance such, for example, as sodium or potassium fluoride, zinc chloride. The preservative includes water soluble inorganic fungicides such, for example, as copper sulphate, potassium sulphide, mercuric chloride, zinc fluorosilicate. If desired, the preservative may comprise one or more insecticides such, for example, as a soluble arsenic salt such as sodium or potassium arsenite, sodium or potassium arsenate. The water soluble substances may be employed either singly or in admixture. The inorganic substance should be preferably one with high solubility in water and high mobility, that is, high osmotic pressure and rate of diffusion.

Further, the invention contemplates the use of tacky pastes comprising two or more soluble inorganic substances capable of reacting to form within the wood an insoluble or difficultly soluble product. For example, with a fluoride or an arsenate, there may be used a water soluble inorganic dichromate such as sodium or potassium dichromate. It would appear that the dichromate salt is reduced, within the wood, to a chromate salt which reacts with the fluoride or arsenate to form a difficultly soluble product having the general structure of a cryolite compound.

For the protective agent, there is employed an organic substance such, for example, as dinitrophenol, dinitrocresol, tar oils, or liquid petroleum. The protective agent is preferably one which is substantially insoluble in water or incompletely miscible therewith, and which has a low viscosity and a high toxicity toward fungi and insects. The expression "water insoluble organic substance" shall include organic substances having a relatively slight solubility in water when compared to the water soluble preservative agents herein disclosed.

The paste-forming ingredient comprises preferably a glutinous substance capable of forming a water swelling colloid such, for example, as starch, dextrine, disintegrated casein, glue, gelatine, agar agar, or gum arabic. These ingredients are adapted to give a tacky paste with water and may be used singly or in admixture with each other.

In general, the preservative agent comprises from about 50% to 80%, the protective agent from about 10% to 35% and the paste-forming glutinous substance from about 5% to 20% by weight.

By way of illustration, but not by way of limiting the scope of the invention, the following examples are given, the ingredients being in parts by weight:

| Examples | I | II | III | IV | V | VI |
|---|---|---|---|---|---|---|
| Sodium fluoride | 900 | 900 | 900 | | | |
| Sodium arsenate | | | | 100 | 50 | 150 |
| Sodium dichromate | | 350 | | | 40 | |
| Dinitrophenol | | 170 | 170 | 50 | 35 | 70 |
| Gum arabic | 130 | | | 30 | | |
| Disintegrated casein | | 150 | | | 10 | |
| Starch | | | 80 | | | 40 |

The several ingredients are ground and mixed thoroughly with water in an amount sufficient to give a viscous paste of the required viscosity, and preferably one having a high degree of tackiness.

If desired, the paste may comprise a wetting agent such, for example, as glycerine, to assist in bringing the preservative and the protective agent into more intimate contact with the wood. The hygroscopicity of the glycerine retards the drying out of the paste. There may be added also, if desired, substances adapted to color the wood or to render the same fireproof, mothproof, etc.

The composition of the invention is applicable for use in various processes for the preservation of wood such for example as coating, dipping, inocculation, steeping in vats with or without the application of pressure vacuum and elevated temperatures, and may be used with green and partly seasoned wood or with seasoned wood which has been previously moistened with water.

The composition is particularly adapted for use in the process claimed in my prior application Serial No. 745,966, in which the preservation of green wood is carried out by stripping the bark from green trees immediately after they have been cut down, coating the debarked surface with an aqueous paste comprising a water soluble preservative and retarding the drying out of the coated wood until the preservative has diffused substantially into the wood.

There is illustrated in the figure the cross section of a tree trunk 1 after it has been treated with the composition of the invention. The preservative agent being a water soluble, inorganic salt, diffuses by osmosis through the cell walls into the wood cells; it also diffuses through the capillaries and interstices between the cells. The penetration of the water soluble preservative is rapid and to a substantial depth as indicated by the area designated A. In time the salt may diffuse completely throughout the heart wood 2 as well as throughout the sap wood 3.

The protective agent, being an organic substance and insoluble in water, diffuses chiefly through the interstices between the cells. The depth of penetration of the protective agent is slight compared to that of the water soluble preservative, the ratio of the depths of penetration being about 1:4. The protective agent is confined to the outermost layers as shown by the area designated B. This area B, impregnated by the water insoluble, organic substance, forms a waterproof zone which prevents the leaching out of the water soluble preservative when the treated timber is placed in damp soil or exposed to rain. In particular, the dinitrophenol appears to unite with the wood fibres and effectively prevents the washing out of the water soluble ingredients of the composition.

The paste-forming colloidal substance serves the important purpose of bringing the preservative and protective agents into intimate contact with the surface of the wood and also retards the drying out of the wood. When the paste dries on the surface of the wood it forms a horny coating designated C which prevents the paste from being washed off or falling off during the storing period. The paste fills the cracks 10 in the tree trunk so that, at these points, the inwardly diffusion is more or less increased depending upon the depth of the crack.

Since the area of wood to be impregnated continuously decreases as the salt diffuses inwardly toward the center of the tree, the fall in the concentration of the salt is very gradual. The outer layers contain the impregnating agents in the highest concentration which is highly desirable since these layers are most subject to attack by the atmosphere and organisms. If the green tree is cut down when the sap is at the maximum, and the freshly cut tree treated with the composition of the present invention, it frequently happens that the osmotic diffusion of the water soluble preservative proceeds to completion, including the heart wood, even after the outer layers of the tree have become air dry.

The composition of the present invention is applicable for the preservation of various types of woods such, for example, as pine, fir, spruce, larch, beech, oak and ash. The composition may be applied to the entire tree trunk or upon finished or partly finished lumber or timbers cut from trees in a green condition. The composition is especially applicable for the treatment of telegraph poles, fence poles, structural timbers and other woods used in the open. Trees intended for use as mine timber, cross ties and marine piles are preferably treated with the compositions containing fluoride and bichromate or another pair of inorganic salts capable of forming an insoluble compound within the wood which is resistant to leaching when the wood is immersed in water or damp soil.

By the present invention there has been provided a novel composition for preserving green wood having many new and unusual advantages. If the tree is treated before the wood has been attacked by insects and plant organisms, the composition protects the wood from a later attack, and increases the useful life of the wood. Any cracks existing in the surface of the wood are filled with the paste in consequence of which the impregnation is deeper at these points and the protection at a maximum. The coating of aqueous paste and the action of the impregnating salt on the sap slows up the drying of the wood and retards the development of injurious cracks in the wood.

Further, the present paste is characterized by its simplicity of composition and economy of application, despite which the depth of penetration is equal to or better than that obtained by the use of aqueous solutions with vacuum, high pressure and elevated temperatures.

Since certain modifications in the composition which embody the invention may be made without departing from its scope, it is intended that all matter contained in the above description shall be interpreted as illustrative and not in a limiting sense.

In the appended claims, the expression "green wood" is intended to designate both green wood containing live sap and wood which is relatively freshly cut, although partially dried, and which has been moistened throughout with water.

I claim:

1. A composition for the preservation of wood, consisting of a viscous tacky paste comprising a water-soluble wood preservative adapted to penetrate the wood by osmosis, a water-insoluble protective agent adapted to penetrate the wood chiefly by capillary diffusion and retard the leaching out of the preservative, water and a glutinous substance adapted to form a water-swelling colloid and maintain the preservative and protective agents in intimate, permanent and uniform contact with the wood, said colloid adapted to give up water on drying to promote the diffusion of the preservative into the wood.

2. A composition for the preservation of wood, consisting of a viscous tacky paste comprising a water-soluble inorganic wood preservative, a water insoluble organic liquid protective agent adapted to penetrate the wood chiefly by capillary diffusion and retard the leaching out of the preservative, water and a glutinous substance adapted to form a water-swelling colloid and maintain the preservative and protective agents in intimate, permanent and uniform contact with the wood, said colloid adapted to give up water on drying to promote the diffusion of the preservative into the wood.

3. A composition for the preservation of wood, consisting of a viscous tacky paste comprising a water-soluble inorganic salt, a water-insoluble organic liquid protective agent adapted to penetrate the wood chiefly by capillary diffusion and retard the leaching out of the salt, water and a glutinous substance adapted to form a water-swelling colloid and maintain the preservative salt and the protective agent in intimate, permanent and uniform contact with the wood, said colloid adapted to give up water on drying to promote the diffusion of the salt into the wood.

4. A composition for the preservation of wood, consisting of a viscous tacky paste comprising a plurality of water-soluble inorganic salts adapted to react within the wood to form a water-insoluble wood preservative, a water-insoluble organic liquid protective agent adapted to penetrate the wood chiefly by capillary diffusion and retard the leaching out of the preservative, water and a glutinous substance adapted to form a water-swelling colloid and maintain the preservative salts and the protective agent in intimate, permanent and uniform contact with the wood, said colloid adapted to give up water on drying to promote the diffusion of the salt into the wood.

5. A composition for the preservation of wood, consisting of a viscous tacky paste comprising from 50% to 80% of a water-soluble wood preservative adapted to penetrate the wood by osmosis, from 10% to 35% of a water-insoluble protective agent adapted to penetrate the wood chiefly by capillary diffusion and retard the leaching out of the preservative, from 5% to 20% of a glutinous substance, and water in an amount sufficient to form with said glutinous substance a water-swelling colloid adapted to maintain the preservative and protective agents in intimate, permanent and uniform contact with the wood and to give up water on drying to promote the diffusion of the preservative into the wood.

6. A composition for the preservation of wood, consisting of a viscous tacky paste comprising from 50% to 80% of a water-soluble inorganic wood preservative, from 10% to 35% of a water-insoluble organic liquid protective agent adapted to penetrate the wood chiefly by capillary diffusion and retard the leaching out of the preservative, from 5% to 20% of a glutinous substance, and water in an amount sufficient to form with said glutinous substance a water-swelling colloid adapted to maintain the preservative and protective agents in intimate, permanent and uniform contact with the wood and to give up water on drying to promote the diffusion of the preservative into the wood.

7. A composition for the preservation of wood, consisting of a viscous tacky paste comprising from 50% to 80% of a water-soluble inorganic salt, from 10% to 35% of a water-insoluble organic liquid protective agent adapted to penetrate the wood chiefly by capillary diffusion and retard the leaching out of the preservative, from 5% to 20% of a glutinous substance, and water in an amount sufficient to form with said glutinous substance a water-swelling colloid adapted to maintain the preservative and protective agents in intimate, permanent and uniform contact with the wood and to give up water on drying to promote the diffusion of the preservative into the wood.

8. A composition for the preservation of wood, consisting of a viscous tacky paste comprising from 50% to 80% of a plurality of water-soluble inorganic salts adapted to react within the wood to form a water-insoluble wood preservative from 10% to 35% of a water-insoluble organic liquid protective agent adapted to penetrate the wood chiefly by capillary diffusion and retard the leaching out of the preservative, from 5% to 20% of a glutinous substance, and water in an amount sufficient to form with said glutinous substance a water-swelling colloid adapted to maintain the preservative and protective agents in intimate, permanent and uniform contact with the wood and to give up water on drying to promote the diffusion of the preservative into the wood.

CARL SCHMITTUTZ.